United States Patent [19]

Tingley

[11] Patent Number: 5,736,220

[45] Date of Patent: Apr. 7, 1998

[54] SURFACE TREATED SYNTHETIC REINFORCEMENT FOR STRUCTURAL WOOD MEMBERS

[76] Inventor: Daniel A. Tingley, 3310 SW Willamette Ave., Corvallis, Oreg. 97333

[21] Appl. No.: 648,040

[22] PCT Filed: Sep. 15, 1995

[86] PCT No.: PCT/US95/11647

§ 371 Date: Oct. 8, 1996

§ 102(e) Date: Oct. 8, 1996

[87] PCT Pub. No.: WO96/08366

PCT Pub. Date: Mar. 21, 1996

Related U.S. Application Data

[63] Continuation-in-part of Ser. No. 307,315, Sep. 16, 1994, Pat. No. 5,498,460, which is a continuation-in-part of Ser. No. 37,580, Mar. 24, 1993, Pat. No. 5,362,545.

[51] Int. Cl.$^6$ .................... B32B 3/06; B32B 3/30; B32B 5/08; E04C 3/12; E04C 3/26; E04C 3/29

[52] U.S. Cl. .................... 428/114; 52/223.8; 52/309.13; 52/309.16; 52/730.7; 52/745.19; 52/DIG. 7; 144/344; 156/154; 156/155; 156/305; 156/307.7; 264/46.1; 264/46.4; 264/139; 264/231; 264/232; 264/233; 427/336; 427/352; 427/353; 428/141; 428/172; 428/298.1; 428/298.7; 428/299.1; 428/299.7; 428/902

[58] Field of Search .................... 52/223.8, 309.13, 52/309.16, 730.7, 745.19, DIG. 7; 144/344; 156/154, 155, 305, 307.7; 264/46.1, 46.4, 139, 231, 232, 233; 427/336, 352, 353; 428/114, 141, 172, 298.1, 298.7, 299.1, 299.7, 902

[56] References Cited

U.S. PATENT DOCUMENTS

| | | | |
|---|---|---|---|
| 2,536,183 | 1/1951 | Jamieson | 428/525 |
| 3,413,188 | 11/1968 | Allen | |
| 3,890,077 | 6/1975 | Holman | 425/111 |
| 4,108,351 | 8/1978 | Hough | 229/62 |
| 4,242,406 | 12/1980 | Bouhnini et al. | 428/236 |
| 4,312,162 | 1/1982 | Medney | 52/309 |
| 4,615,163 | 10/1986 | Curtis et al. | 52/730 |
| 4,965,973 | 10/1990 | Engebretsen | 52/223 |
| 5,000,808 | 3/1991 | Deviney | 156/178 |
| 5,006,390 | 4/1991 | Kavesh et al. | 428/105 |
| 5,026,593 | 6/1991 | O'Brien | 428/215 |
| 5,135,793 | 8/1992 | Socha | 428/74 |
| 5,362,545 | 11/1994 | Tingley | 428/96 |
| 5,498,460 | 3/1996 | Tingley | 428/96 |

FOREIGN PATENT DOCUMENTS

| | | |
|---|---|---|
| 4149346 | 5/1992 | Japan. |
| 224050 | 2/1990 | New Zealand. |
| wo 96/08366 | 3/1996 | WIPO. |

OTHER PUBLICATIONS

Wood Design Focus, A Newsletter of Contemporary Wood Engineering, vol. 4, No. 2, Summer 1993, R. J. Leichti, Editor.

van de Kuilen, Proceedings of the 1991 International Timber Engineering Conference, vol. 3, Sep. 2–5, 1991, pp. 226–233.

Tingley, Proceedings of the 1988 International Conference on Timber Engineering, vol. 1, Sep. 19–22, pp. 422–427.

(List continued on next page.)

*Primary Examiner*—James C. Cannon
*Attorney, Agent, or Firm*—Stoel Rives LLP

[57] ABSTRACT

A synthetic reinforcement having surface features that facilitate adhesion of the reinforcement to another surface and a process for making the same is disclosed. The synthetic reinforcement is comprised of a plurality of continuous fibers that are maintained in position by a resin encasement. An external surface of the synthetic reinforcement can be characterized by micro-recesses that are located in a generally random pattern, which increases the surface area of the resin encasement.

40 Claims, 7 Drawing Sheets

OTHER PUBLICATIONS

Tingley, Predicting Strength Criteria for Kevlar and Fiberglass Reinforced Plastic (KRP & FRP) Glued Laminated Beams, pp. 301–304, vol. 2 of the Proceedings of the Second Pacific Engineering Conference, 1989.

Rowlands et al., Fiber–Reinforced Wood Composites, Wood and Fiber Science, vol. 18 (1), Jan. 1986, pp. 40–57.

Tingley, Reinforced Glue–Laminated Wood Beams, 96 Page Thesis accepted Nov. 1987 by the University of New Brunswick (Canada) as partial fulfillment for M.S. Eng. Dept. of Civil Engineering.

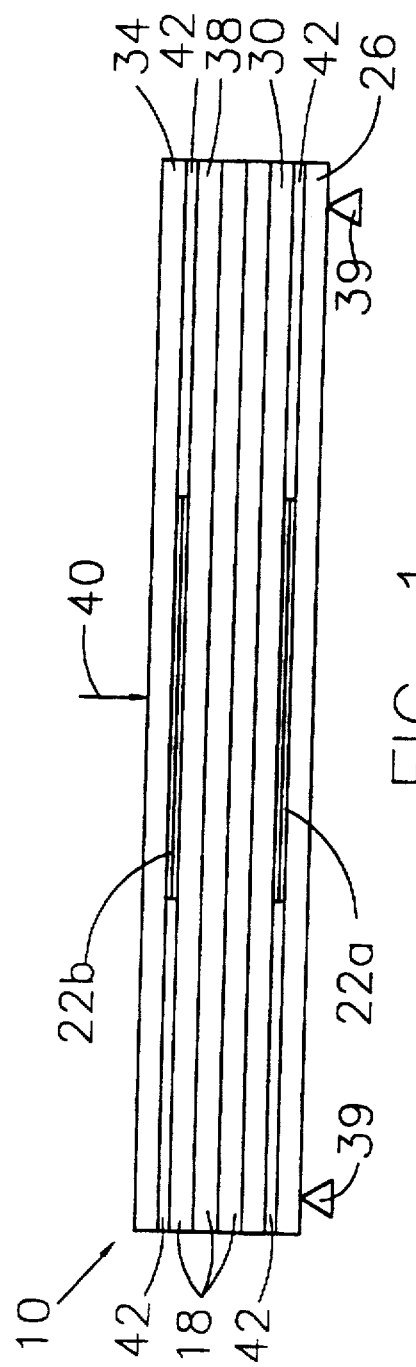
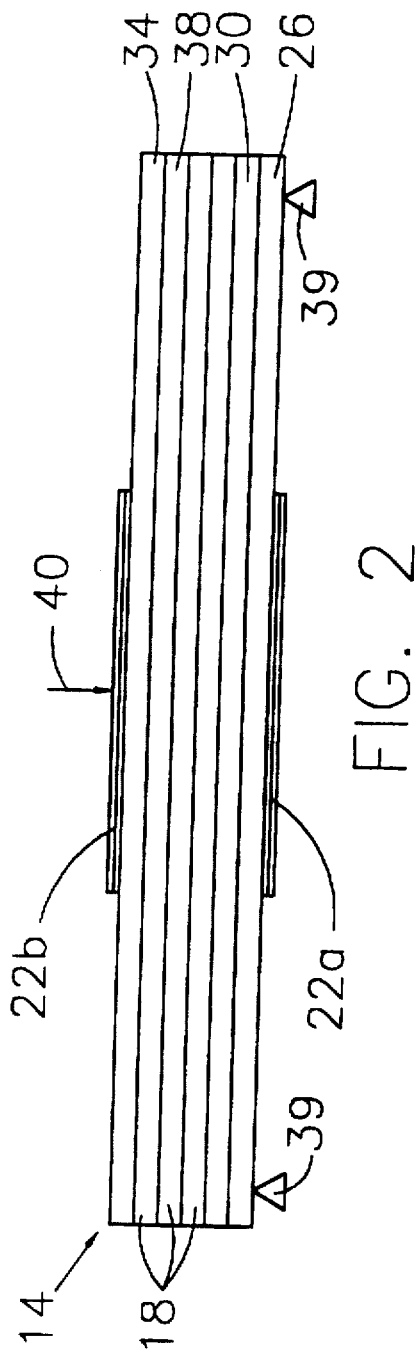

SURFACE TREATED SYNTHETIC REINFORCEMENT FOR STRUCTURAL WOOD MEMBERS

RELATED APPLICATION

This application is a continuation-in-part of application Ser. No. 08/307,315, filed Sep. 16, 1994, which is a continuation-in-part of application 08/037,580 filed Mar. 24, 1993, now Pat. No. 5,362,545.

TECHNICAL FIELD

This invention pertains to the reinforcement of structural wood members, including beams, columns, panels, and trusses. More particularly, the present invention pertains to synthetic reinforcements, each having a surface adapted for improved adhesion into a structural wood member. The purpose of the reinforcements being to brace the member against tensile stress or compression stress or both caused by a heavy loading of the member. The processes for fabricating such a synthetic reinforcement are also a part of the present invention.

DESCRIPTION OF THE RELATED ART

Beams, trusses, joists, and columns are the typical structural members that support the weight or loads of structures, including buildings and bridges. Structural members may be manufactured from a variety of materials, including steel, concrete, and wood, according to the structure design, environment, and cost.

Wood structural members are now typically manufactured from multiple wood segments that are bonded together, such as in glue-laminated members, laminated veneer lumber, parallel strand lumber, and I-beams. These manufactured wood structural members have replaced sawn lumber or timbers because the former have higher design limits resulting from better inspection and manufacturing controls. Wood is a highly desirable material for use in structural members because of its advantageous characteristics, including strength to weight, appearance, cyclic load response, and fire resistance.

Laminated beams can be used structurally to span open areas to support loads of many tons. Typically, when loading a laminated beam or beams with a uniform load between support points, the bottom laminae are primarily subjected to tensile stress, while the top laminae are primarily subjected to compressive stress.

Synthetic reinforcements for wood beams can be designed specifically to resist high tensile stress or to resist high compressive stress. The load-bearing capacity of laminated beams may be increased substantially by adding synthetic reinforcements to the areas of greatest stress, namely, close to the bottom laminae and close to the top laminae. The synthetic reinforcements used in the areas of high tensile and compressive stress would typically differ to provide superior reinforcing.

There is a need for synthetic reinforcements that can be effectively and economically adhered to a wood lamina. Until the present invention, plastic panels could be adhered to wood beams and to each other and other structural wood members only with expensive epoxy adhesives. In contrast, the wood laminae of wood structural members are typically bonded together with a low-cost adhesive such as resorcinol, phenol-resorcinol, cross-linked melamine, and polyvinyl acetate (PVA). Thus, a separate gluing step and a separate gluing application apparatus are typically necessary for gluing synthetic reinforcements to the wood laminae to make reinforced glue-laminated wood beams.

SUMMARY OF THE INVENTION

Accordingly, it is an object of the present invention to provide improved adhesion of synthetic reinforcements to one another and into structural wood members, including laminated wood members.

Another object of the present invention is to provide synthetic reinforcements having a surface treatment that facilitates the use of commercial grade adhesives such as resorcinol to adhere the improved synthetic reinforcement to wood members.

A further object of the present invention is to provide an improved synthetic reinforcement including a resin encasement having a major surface with micro-recesses that increase the surface area of the resin encasement and increase adhesion into the substrate thereby increasing the sheer performance of the adhesive.

The problems associated with known reinforcement panels are addressed in the present invention by providing reinforcements having a surface adapted for improved adhesion to wood laminae and to one another. The present invention provides a synthetic reinforcement that may include a plurality of continuous fibers in a resin encasement. The surface of the resin encasement includes a multitude of micro-recesses, generally located in a random pattern, that increase the surface area of the resin encasement. These micro-recesses may have a depth and width as small as one or two microns. At the largest they may be one or two millimeters wide and deep.

The micro-recesses also may be provide tiny spaces where glues can accumulate and polymerize to increase glue line shear resistance. The increased surface area of the synthetic reinforcement of the present invention may be bonded to wood laminae or themselves with inexpensive commercial grade adhesives including resorcinol resins such as are commonly used for adhering wood laminae to each other.

The present invention also includes a fabrication process for making reinforced wood structural members having increased load-carrying capacity. First, a synthetic reinforcement having its surfaces covered with micro-recesses is prepared. To do this a nonreactive agent such as a volatile liquid or a solid particulate is dispersed into a curable resin. Alternatively, a multiplicity of many gas filled spheroids, each with a diameter of up to 2 millimeters may be dispersed into the resin. These spheroids may be comprised of plastic, glass or any other material that may be satisfactorily fashioned into the required shape.

Next, a plurality of continuous fibers are wetted with this mixture and the resin is cured. If the agent is a liquid, it should generally turn to gas during the curing process, leaving a set of bubbles at the surfaces of the panel. The surfaces of the reinforcing member which are to be adhered to a lamina are then abraded to either remove the top surfaces of the bubbles if the agent used was either a liquid or a multiplicity of gas-filled spheroids or to remove surface embedded particles if a solid particulate was used. A random pattern of micro-recesses results from this final step.

The surfaced reinforcement panel may be bonded to one or more wood members or other reinforcement panels or laminae such that the adhesive contacts at least a portion of a plurality of the micro-recesses.

Additionally, the present invention includes optimization of the length of time between application of a layer of adhesive to a first surface and the contacting of a second surface over this adhesive layer. The duration of this period is referred to as "open time." Optimization of open time according to the present invention increases the strength and integrity of the wood to reinforcement bond.

The foregoing and other objectives, features, and advantages of the invention will be more readily understood upon consideration of the following detailed descriptions, taken in conjunction with the accompanying drawings.

BRIEF DESCRIPTION OF THE DRAWINGS

FIG. 1 is a side elevational view of a wood laminated beam showing the improved synthetic reinforcements of the present invention located between laminae;

FIG. 2 is a side elevational view of a wood laminated beam showing the improved synthetic reinforcements of the present invention located on its exterior surfaces;

FIG. 6B shows the reinforcement after the resin has cured and the surface has been sanded leaving micro-recesses.

DETAILED DESCRIPTION OF PREFERRED EMBODIMENTS

Figure 3:
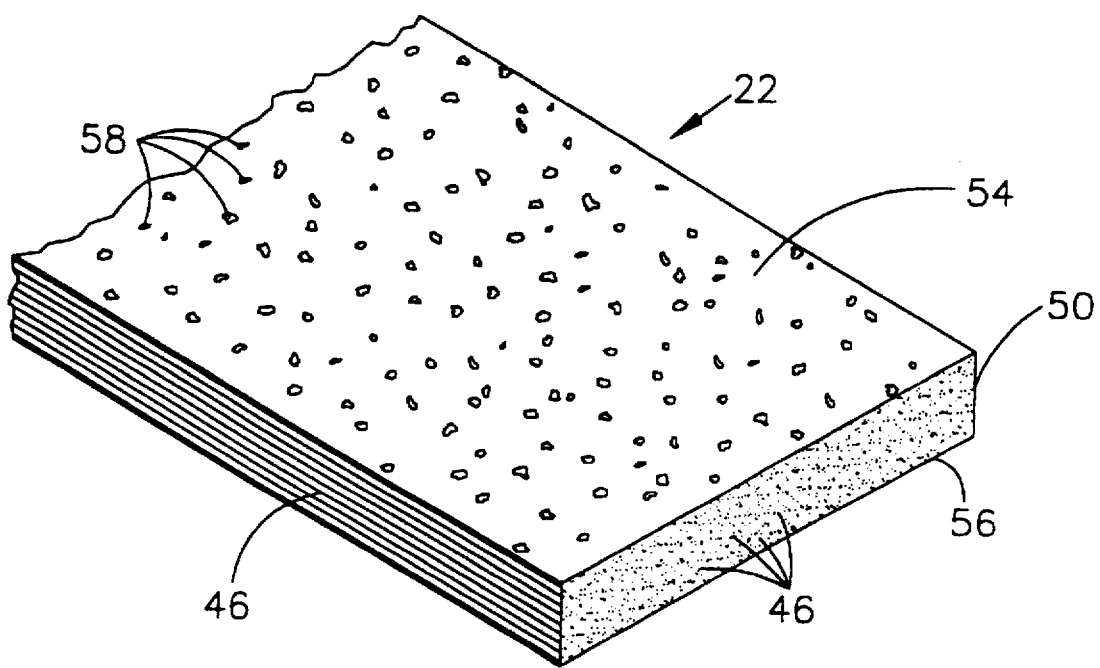
FIG. 3 is a perspective view of an improved reinforcement panel embodying the present invention.

FIGS. 1 and 2 show glue laminated wood structural members 10 and 14 having multiple wood laminae 18 that are bonded together and are preferably elongate boards. In this configuration, wood beams 10 and 14 are configured as glue-laminated timbers according to manufacturing standards 117-93 of the American Institute of Timber Construction (AITC) of Englewood, Colo. Although this is a preferred configuration of wood beams 10 and 14, the following description is similarly applicable to other wood structural members, including laminated veneer lumber, parallel strand lumber, wood I-beams, and reinforced wood composites.

Referring to FIG. 1, a first set of synthetic reinforcements 22a is located between the bottom lamina 26 and adjacent lamina 30. A second set of synthetic reinforcements 22b is located between the top lamina 34 and its adjacent lamina 38. Each of reinforcement sets 22a and 22b, referred to collectively as reinforcements 22, extends approximately three-fifths the length of beam 10. Reinforcements could extend for a greater portion of beam 10 or could extend the full length of beam 10.

As exemplary simple beams, wood structural members 10 and 14 would be supported by a pair of supports 39 and bear a load 40. In such a configuration, synthetic reinforcement sets 22a and 22b are positioned in regions of, respectively, high tensile stress and high compressive stress. It will be appreciated, however, that reinforcement sets 22a and 22b could alternatively be in regions of high compressive and tensile stress, respectively, if structural members 10 and 14 were cantilevered.

Spacers 42 extend from each end of each of reinforcement sets 22a and 22b to the end of wood beam 10 and are preferably made of wood. A reinforcement set which covers two-fifths to three-fifths of the central portion of the beam provides substantially all the essential benefit of a full-length reinforcement set but at a lower cost per beam. FIG. 2 illustrates just one alternative embodiment of the present invention wherein reinforcement sets 22a and 22b are located on the exterior of wood beam 14 and no spacers are provided.

FIG. 3 is an enlarged illustration of a single reinforcement 22 showing that it includes multiple synthetic fibers 46 that are arranged generally parallel to one another and are generally aligned with a longitudinal dimension of reinforcement 22, as described below in greater detail. Synthetic fibers 46 are maintained in their arrangement and alignment by a resin encasement 50 that surrounds the fibers and fills the interstices between the fibers. In one preferred embodiment, the resins are curable, inexpensive, commercial grade adhesives including, for example, resorcinol resins, phenol-resorcinol, cross-linked melamine, and polyvinyl acetate (PVA), which are suitable for adhering wood laminae 18 (and reinforced wood composites) to each other.

Reinforcing fibers 46 are preferably aramid fibers, fiberglass, or carbon fibers. Aramid fibers are available from E. I. dupont de Nemours & Co., Delaware, under the trademark Kevlar™ and from Akzo N.V.'s fiber subsidiary, Enka BV (Arnhem, the Netherlands) under the trademark Twaron™. A preferred grade of aramid fibers is Kevlar 49™. Fibers 46 may also comprise or include a high modulus polyethylene fiber such as high molecular weight Spectra™ sold by Allied Fibers of Allied Signal, Petersburg, Va. Another possible fiber is S-2 glass from Owens-Corning Fiberglass, Corning, N.Y. Aramid fibers and carbon fibers are the preferred materials in regions of high tensile and high compressive stress, respectively. Fiberglass fibers are a lower cost alternative to both.

Experimentation with nonepoxy resin encasements has resulted in interlaminar shear failure in reinforcement 22. Preferably, the curable resin used in fabrication of the reinforcement 22 is an epoxy resin. However, alternative embodiments could use other resins such as polyester, vinyl ester, and phenolic resins. Alternative embodiments of the present invention could use thermoplastic resins including poly(ethyleneterephthalate) (PET), PSP, or nylon-66.

Although there are likely to be many instances when a single reinforcement 22 will provide sufficient strength and modulus of elasticity to enable a laminate to meet a predetermined set of requirements, it is also possible to adhere a set of synthetic reinforcements 22a or 22b into a laminate as is clearly shown in FIGS. 1 and 2. The synthetic reinforcements 22 described here can be adhered to one another without the use of epoxy resins.

In accordance with the present invention, multiple micro-recesses 58 in resin encasement 50 are distributed over the opposed major surfaces 54 and 56 of reinforcement 22. Micro-recesses 58 increase the surface area of reinforcement 22, facilitate adhesion of reinforcement 22 to adjacent wood laminae 18 and to itself in multiple laminations, and increase the strength of the adhesive bonding.

In the prior art, reinforcements 22 have been made by wetting fibers in a resin bath and subsequently curing the encasement of resin 50. In the preferred method of producing a reinforcing member with micro-recesses 58 in its surface, a non-reactive agent is mixed in with the resin bath, the fibers are then wetted by the mixture of the agent and the curable resin, forming encasement 50.

Figure 4A:
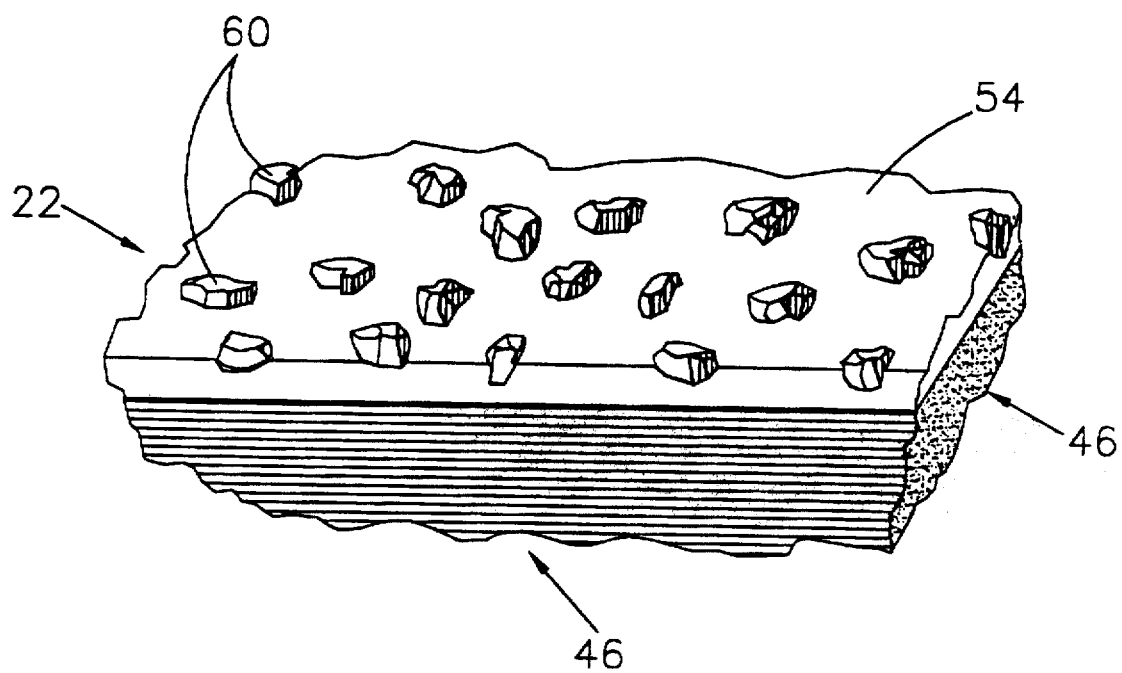
FIGS. 4A and 4B are greatly expanded fragmentary sectional views of an improved reinforcement panel of the present invention showing in FIG. 4A solid particulates on the resin encasement and in FIG. 4B the resulting micro-recesses after the solid particulates are removed.
Figure 4B:
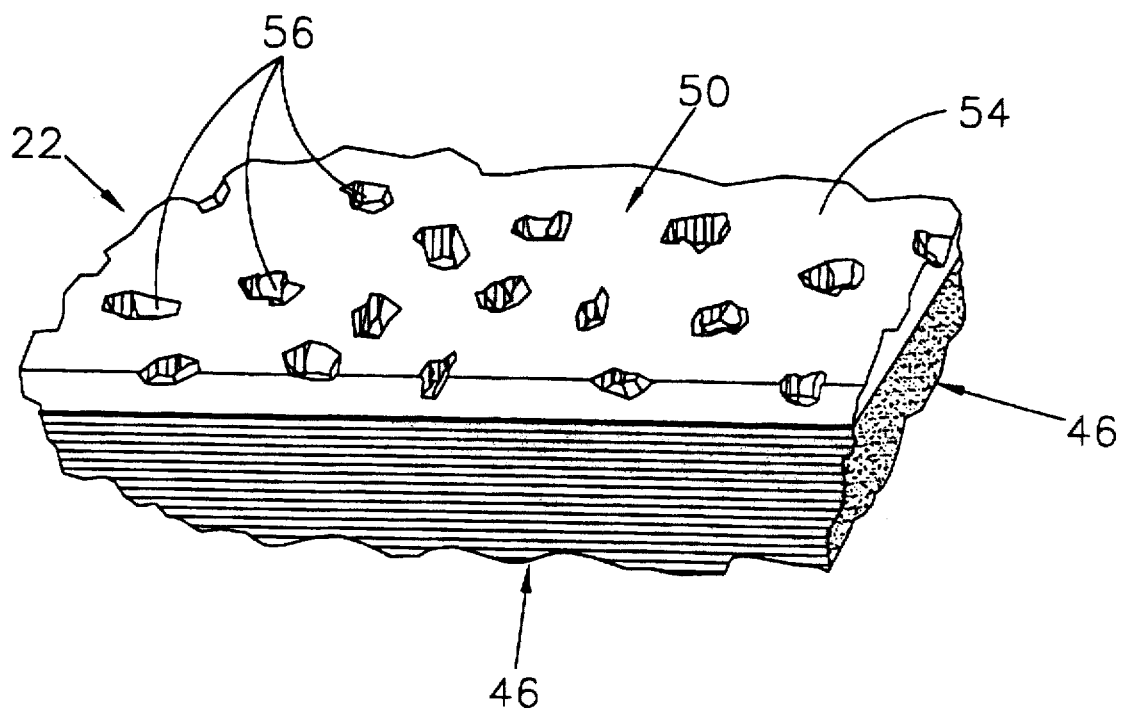

Referring to FIGS. 4A and 4B, the agent may be a solid particulate 60, such as chalk dust or clay. The agent is removed, and micro-recesses 58 are formed, by light abrasion of major surfaces 54 and 56 after the curing of resin encasement 50. Typically, the micro-recesses will be on the order of a few microns in depth and width. At their largest they may be on the order of one or two millimeters in depth and width.

One drawback of this method is that some particulate 60 will remain mixed in with the resin 50, corrupting it to the detriment of the mechanical properties of the cured resin 50. In general, however, the improved adhesion qualities of reinforcement 22 more than compensate for whatever mechanical properties are lost.

Figure 5A:
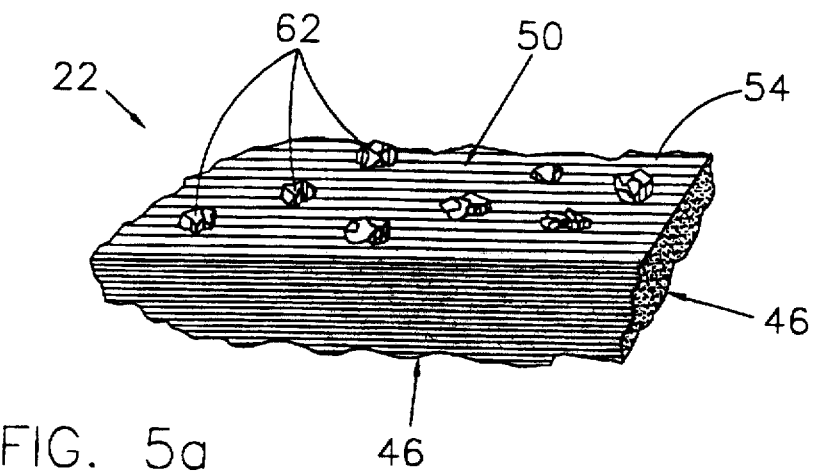
FIGS. 5A–5C are greatly expanded fragmentary sectional views of an alternative improved reinforcement panel of the present invention showing in FIG. 5A solid particulates or liquid droplets on the reinforcing fibers, in FIG. 5B an overlying resin encasement, and in FIG. 5C the resulting micro-recesses formed after the droplets or the particulates are removed.
Figure 5B:
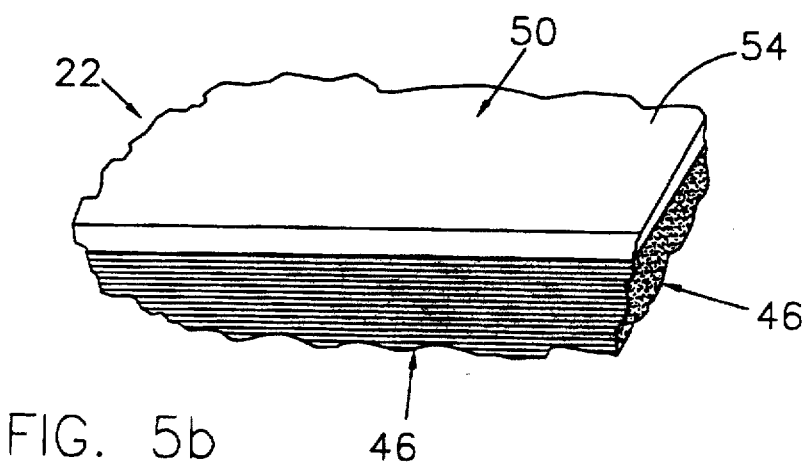
Figure 5C:
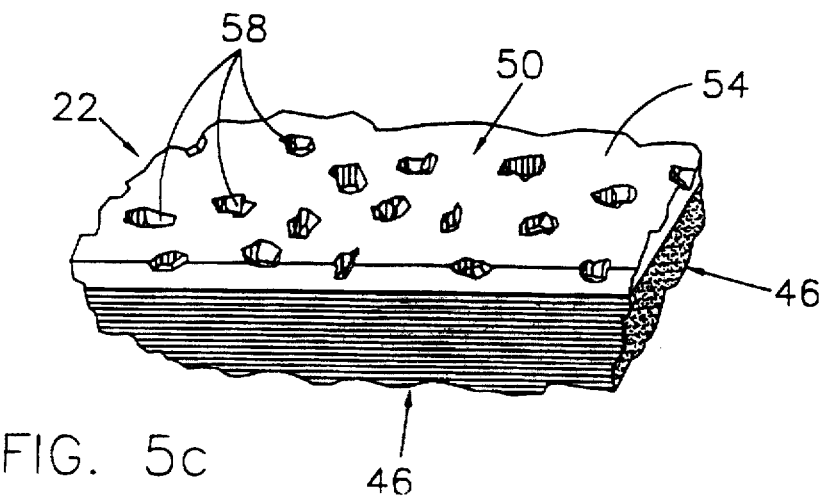

In an alternative method, described with reference to FIGS. 5A–5C, the agent may be or may include spritzed liquid material 62 that is added to the resin bath (not shown) prior to the wetting of the reinforcing fibers 46. For example, a liquid agent 62 may be selected to have a boiling point lower than the temperature selected for curing resin encasement 50. After the fibers 46 are wetted in the bath, during the step of curing the resin, this material generates, forms, or becomes bubbles of nonreactive gas. These bubbles tend to move to the nearest surface of the synthetic reinforcement where they either pop, forming micro-recesses 58 or remain as bubbles during curing. After the resin is cured, some light abrasion is applied to remove the exposed surface of the remaining bubbles, leaving additional micro-recesses 58.

In one embodiment, the liquid agent 62 may be methylethylketone or toluene and is preferably added to the curable resin at 2 to 15 weight percent agent/resin (wt %). In one particular preferred embodiment, the agent is toluene added to the curable resin at a concentration of approximately 5 wt %.

Figure 6A:
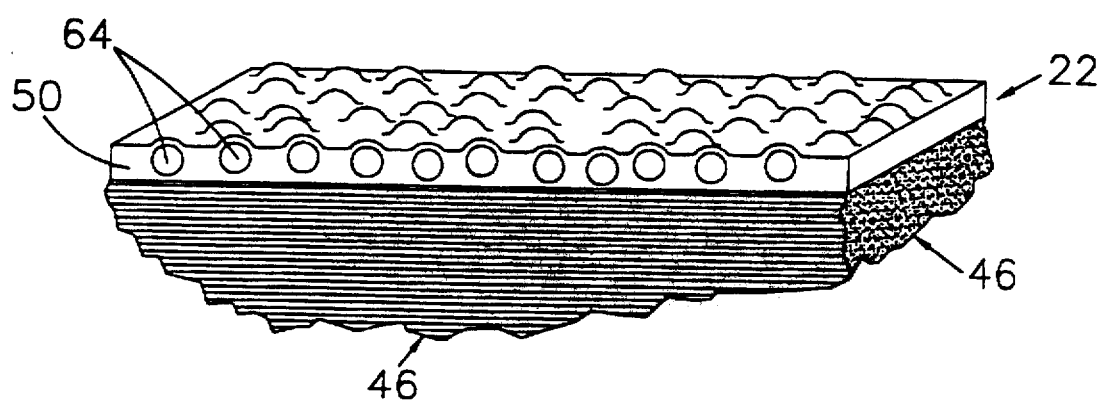
FIGS. 6A–6B are greatly expanded fragmentary sectional views of another improved reinforcement panel of the present invention, showing in FIG. 6A a multiplicity of gas-filled spheroids in a partially finished reinforcement.
Figure 6B:
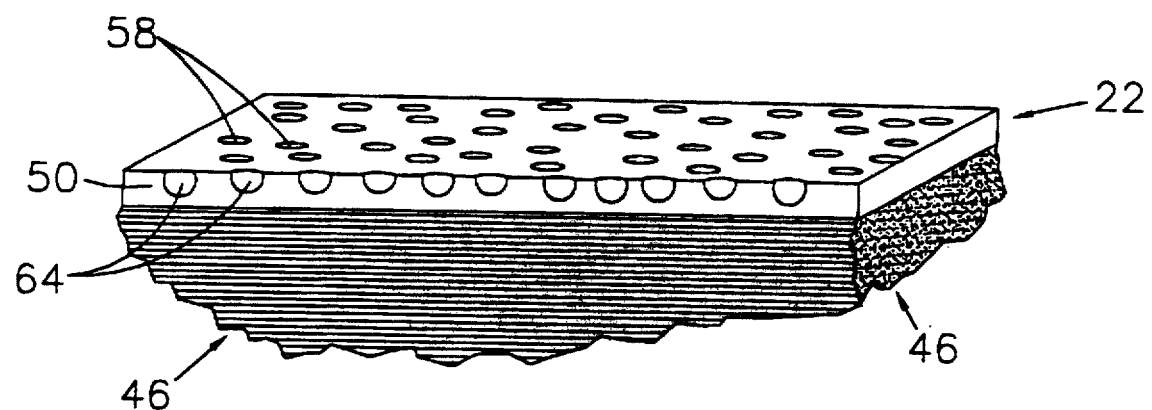

An additional method of creating micro-recesses 58, shown in FIG. 6, is to add a multiplicity of gas-filled spheroids 64 with diameters on the order of about 10 to 2,000 microns in diameter, to the resin bath (not shown). Gas-filled spheroids 64 are widely available and are sometimes used for packing purposes. They may be made out of many different materials, including, it is believed, thermoset resins and thermoplastics. After the fibers 46 are dipped in the resin bath and the resin 50 is cured, a limited amount of abrasion is then sufficient to remove the exposed portion of bubbles 64, leaving micro-recesses 58 in the cured resin 50. Gas-filled spheroids 64 have the advantage of moving more certainly toward the surfaces of the synthetic reinforcement 22 during the curing process, thereby leaving few bubbles 64 in the interior of reinforcement 22.

The synthetic reinforcements 22 created by this method may be less than 2 mm thick. As noted elsewhere, if one of these reinforcements is not sufficiently strong, a number of reinforcements 22 may be glued together to form a set 22a or 22b which together have the requisite strength.

Another preferred method of creating micro-recesses 58 in surface 54 of resin encasement 50 is by abrading surface 54. This may be done by rubbing a grit abrasive in a direction transverse or longitudinal to the longitudinal direction of reinforcement 22. Abrading the surface 54 of resin encasement 50 removes a small portion of the cured resin. Abrading surface 54 of encasement resin 50 may remove particulate agent 60 or expose voids formed by liquid or solid agent 62, which upon exposure become micro-recesses 58. Adhesive 66 may then enter micro-recesses 58 and facilitate a strong and resilient bond of reinforcement 22 to lamina 18 of beam 10, 14, or to some other structural member.

Reinforcement 22 of the present invention may be fabricated by the pultrusion process as described in U.S. Pat. No. 5,362,545 which is hereby incorporated by reference.

Experimentation has led to the important discovery that open times may be optimized. Open time is the time during which the adhesive used for the reinforcement/wood lamina interface is allowed to air dry and penetrate the surface prior to being brought into contact with other bond-forming surfaces. After application of adhesive to a surface of a synthetic reinforcement panel to be used as a surface of the reinforcement/wood lamina interface, the adhesive bearing surface is typically given a short amount of open time. Five to 10 minutes has been typical in testing; for use in production, longer open times are typical.

After the open time, the adhesive-bearing surface is brought into contact with the desired surface of wood lamina, which may also bear adhesive and have also been given an open time. According to a preferred embodiment of the present invention, open time for reinforcement is preferably greater than 10 minutes but less than 80 minutes and is most preferably 30 minutes. An open time of greater than 80 minutes may be preferable for some applications, such as the manufacture of larger beams. After open time, and after the adhesive-bearing surface is brought into contact with the desired surface, the reinforcement and wood lamina are typically clamped together to ensure optimal bonding under pressure of over 125 psi to form a glue line thickness of less than 0.004 inches.

Typical clamp time has been eight to 10 hours if no post-clamp time is permitted prior to the application of stress to the reinforced structural member. It has been found that post-clamp cure time increases the strength of the bond and allows for more complete curing.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims that follow.

I claim:

1. A synthetic reinforcement to be adhered into a wood structural member for increasing a load-carrying capacity of the wood structural member, said reinforcement comprising:
   a plurality of continuous fibers; and
   a resin encasement for including substantially all of said continuous fibers and having a surface characterized by a plurality of micro-recesses located in a generally random pattern for the purpose of facilitating adhesion of the synthetic reinforcement to another surface.

2. The synthetic reinforcement of claim 1 wherein said fibers are aramids, fiberglass, polyethylene, or carbon.

3. The synthetic reinforcement of claim 1 wherein said resin encasement defines a plurality of gas filled voids located in a random distribution therein.

4. The synthetic reinforcement of claim 1 further including a plurality of fibers having an end that protrudes from said surface of said resin encasement for the purpose of facilitating adhesion of said panel to the structural member.

5. The reinforcement of claim 1 wherein said resin encasement is epoxy resin, polyester, vinyl ester, or phenolic resin.

6. The reinforcement of claim 1 wherein said resin encasement is polyimides, PSP, PET, or nylon-66.

7. A synthetic reinforcement to be adhered to a wood structural member for increasing a load-carrying capacity of the wood structural member, said reinforcement comprising:
   a plurality of continuous fibers; and
   a resin encasement for including substantially all of said continuous fibers therein characterized by surface features area-increasing on at least one external major surface which serve to facilitate adhesion of that surface to another surface; and
   wherein said synthetic reinforcement is less than 2 millimeters thick.

8. The synthetic reinforcement of claim 7 wherein the synthetic reinforcement has a major surface covered with micro-recesses.

9. The structural would system of claim 7 wherein said fibers are aramids, fiberglass, polyethylene, or carbon.

10. The structural wood system of claim 7 wherein the resin encasement defines a plurality of gas filled voids located in a random distribution therein.

11. The structural wood system of claim 7, further including a plurality of fibers that each has an end that protrudes from said surface of said resin encasement for the purpose of facilitating adhesion of said panel to the structural member.

12. The structural wood system of claim 7 wherein said resin encasement is formed of epoxy resin, polyester, vinyl ester, or phenolic resin.

13. The structural wood system of claim 7 wherein said resin encasement is formed of polyimides, PSP, PET, or nylon-66.

14. A structural wood system, wherein a first wood lamina is adhesively connected to a set of adhesively joined synthetic reinforcements, each comprising:
   a plurality of substantially continuous fibers along the length of the synthetic reinforcement; and
   a resin encasement for encasing substantially all of the fibers characterized by surface area-increasing features on at least one external major surface which serve to facilitate adhesion of that surface.

15. The structural wood system of claim 14 wherein a second wood lamina is adhesively connected to said set of adhesively joined synthetic reinforcements opposite to said first wood lamina.

16. The structural would system of claim 14 wherein said fibers are aramids, fiberglass, polyethylene, or carbon.

17. The structural wood system of claim 14 wherein the resin encasement defines a plurality of gas filled voids located in a random distribution therein.

18. The structural wood system of claim 14, further including a plurality of fibers that each has an end that protrudes from said surface of said resin encasement for the purpose of facilitating adhesion of said panel to the structural member.

19. The structural wood system of claim 14 wherein said resin encasement is formed of epoxy resin, polyester, vinyl ester, or phenolic resin.

20. The structural wood system of claim 14 wherein said resin encasement is formed of polyimides, PSP, PET, or nylon-66.

21. The structural wood system of claim 14 wherein at least one additional synthetic reinforcement is adhesively attached to the first synthetic reinforcement.

22. The structural wood system of claim 14 wherein said system further comprises parallel strand lumber.

23. The structural wood system of claim 14 wherein said system further comprises laminated veneer lumber.

24. The structural wood system of claim 14 wherein said system further comprises an I-beam.

25. The structural wood system of claim 14 wherein each synthetic reinforcement has a major surface covered with micro-recesses.

26. A process for making a synthetic reinforcement adapted to be adhesively joined with a wood lamina, said process comprising the steps of:
   dispersing an agent throughout a resin bath, said agent being generally nonreactive with and at least partly removable from said resin;
   wetting a plurality of continuous fibers with the resin;
   curing said curable resin; and
   inducing the departure of at least a portion of said agent from said curable resin to create a random pattern of micro-recesses in the synthetic reinforcement.

27. The process of claim 26 wherein the curing step further includes the evaporation of a portion of said agent.

28. The process of claim 26 wherein said fibers are aramids, fiberglass, polyethylene, or carbon.

29. The method of claim 26 wherein said resin is epoxy resin, polyester, vinyl ester, or phenolic resin.

30. The method of claim 26 wherein said resin is polyimides, PSP, PET, or nylon-66.

31. The process of claim 26 further comprising the step of abrading said synthetic reinforcement after said inducing step so as to cause some portion of said fibers to protrude from said resin encasement.

32. The process of claim 26 further comprising the step of creating voids in the resin.

33. The process of claim 26 wherein said curing step is accomplished by applying heat to said curable resin and said agent comprises a nonreactive liquid with a boiling point lower than the highest temperature reached in the curing process.

34. The process of claim 26 wherein the agent used is a solid particulate.

35. The process of claim 26 wherein the agent used comprises a multiplicity of gas-filled spheroids.

36. The process of claim 35 wherein the gas-filled spheroids are comprised of plastic.

37. The process of claim 35 wherein the plastic gas-filled spheroids are comprised of thermoset resin.

38. The process of claim 35 wherein the plastic gas-filled spheroids are comprised of thermoplastic.

39. A process for making an engineered reinforced wood structural member having an increased load-carrying capacity, said process comprising the steps of:
   providing a synthetic reinforcement comprising a plurality of continuous fibers and a resin encasement for including substantially all of said continuous fibers, said resin encasement having a surface in which a plurality of micro-recesses is present; and
   adhesively connecting at least one said synthetic reinforcement to at least one of a multiplicity of connected wood laminae, wherein said adhesive contacts at least a portion of said micro-recesses.

40. An engineered structural wood member made by the process of claim 39.

* * * * *